No. 634,591. Patented Oct. 10, 1899.
H. R. SIEVERKROPP.
BICYCLE PEDAL ATTACHMENT.
(Application filed Oct. 7, 1898.)
(No Model.)
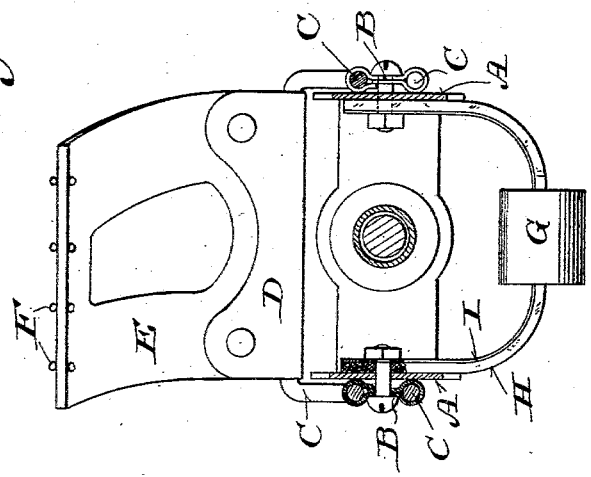
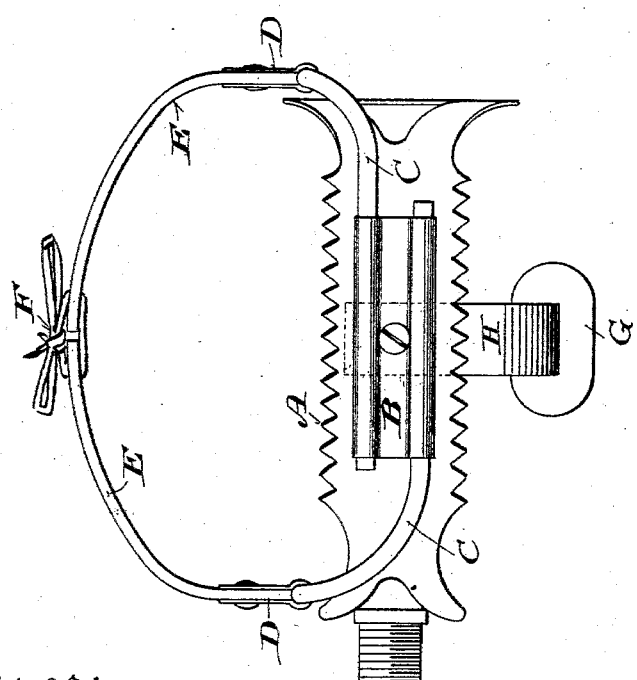
Witnesses:
Geo. W. Young.
N. E. Oliphant.
Inventor:
Henry R. Sieverkropp
By H. G. Underwood
Morweig

UNITED STATES PATENT OFFICE.

HENRY R. SIEVERKROPP, OF RACINE, WISCONSIN.

BICYCLE-PEDAL ATTACHMENT.

SPECIFICATION forming part of Letters Patent No. 634,591, dated October 10, 1899.

Application filed October 7, 1898. Serial No. 692,886. (No model.)

*To all whom it may concern:*

Be it known that I, HENRY R. SIEVERKROPP, a citizen of the United States, and a resident of Racine, in the county of Racine and State of Wisconsin, have invented certain new and useful Improvements in Bicycle-Pedal Attachments; and I do hereby declare that the following is a full, clear, and exact description thereof.

My invention has for its object to facilitate speeding and control of a bicycle by providing the latter with simple, economical, strong, and durable pedal attachments, hereinafter more particularly set forth with reference to the accompanying drawings and subsequently claimed.

Figure 1 of the drawings represents a front elevation of a bicycle-pedal provided with attachments in accordance with my invention, and Fig. 2 a transverse section of the same.

Referring by letter to the drawings, A indicates a bicycle-pedal of the well-known rattrap variety. In detachable bolt-and-nut connection with the front and rear bars of the pedal are spring-metal plates B, each of which is bent to form a pair of parallel split sleeves longitudinally thereof. In adjustable engagement with the sleeve portions of the plates B are horizontal ends of otherwise upwardly-curved angular yokes C, and compression of the sleeves serves to hold the yokes C in adjusted position, this compression being had by the same means employed to hold said plates in detachable connection with the pedal. In loose connection with each of the pair of the angular yokes C is a shackle D, fast to a broad piece E of leather, canvas, or other suitable flexible material, and there being two of these pieces the same are adjustably united by a lace F, run through apertures therein, and openings may be formed in the parts E, as herein shown, to increase their flexibility. The lace is drawn up or let out in proportion to the adjustment of the yokes C in the sleeve portions of the plates B aforesaid.

The plate B, yokes C, and the lace-connected flexible sections E in loose connection with said yokes constitute an adjustable foot-clip attachment for a bicycle-pedal of any well-known variety. Clips similar to those herein set forth not only insure foothold on pedals to which they are connected, but they also render it possible for bicycle-riders to exert their greatest lifting power upon said pedals.

In order that the aforesaid attachment may not overbalance a pedal, a counterweight attachment is herein shown as consisting of a hanger in the form of a bow and a block G, of sufficiently heavy material, in sliding connection with said hanger, the latter being secured at its ends transversely of a pedal by the same means employed to hold the foot-clip attachment in place. The preferred hanger comprises a leather strip H, having a lining I of flexible metal. Therefore it will readily yield to obstructions and can be as readily restored to normal shape.

Having thus described my invention, what I claim as new, and desire to secure by Letters Patent, is—

1. A foot-clip comprising a pair of plates attachable to the front and rear of a bicycle-pedal, a pair of yokes in adjustable connection with the plates, and lace-connected flexible devices in loose connection with the yokes.

2. A foot-clip comprising spring-metal plates each bent to form a pair of parallel split sleeves longitudinally thereof, clamping devices for connecting the plates with front and rear of a bicycle-pedal, a pair of yokes having their ends adjustable in said sleeves, and lace-connected flexible devices in loose connection with the yokes.

In testimony that I claim the foregoing I have hereunto set my hand, at Racine, in the county of Racine and State of Wisconsin, in the presence of two witnesses.

HENRY R. SIEVERKROPP.

Witnesses:
A. CARY JUDD,
E. S. JUDD.